US009744718B2

(12) United States Patent
Yu et al.

(10) Patent No.: US 9,744,718 B2
(45) Date of Patent: Aug. 29, 2017

(54) APPARATUS AND METHOD FOR STICKING CLOTH

(71) Applicants: BOE Technology Group Co., Ltd., Beijing (CN); Hefei Xinsheng Optoelectronics Technology Co., Ltd., Anhui (CN)

(72) Inventors: Peng Yu, Beijing (CN); Wenhao Wang, Beijing (CN); Jie Wang, Beijing (CN); Qiang Xiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 304 days.

(21) Appl. No.: 14/739,574

(22) Filed: Jun. 15, 2015

(65) Prior Publication Data

US 2016/0114524 A1 Apr. 28, 2016

(30) Foreign Application Priority Data

Oct. 24, 2014 (CN) .......................... 2014 1 0577893

(51) Int. Cl.
*G02F 1/1337* (2006.01)
*B29C 63/02* (2006.01)
(Continued)

(52) U.S. Cl.
CPC ........ *B29C 63/024* (2013.01); *B29C 63/0047* (2013.01); *B29C 63/0065* (2013.01);
(Continued)

(58) Field of Classification Search
CPC .............. G02F 1/133784; B29C 63/00; B29C 63/0047; B29C 63/06; B65H 81/06; B41F 27/005; Y10S 101/36; Y10T 29/49563
(Continued)

(56) References Cited

U.S. PATENT DOCUMENTS

2012/0302414 A1 11/2012 Prushinskiy et al.

FOREIGN PATENT DOCUMENTS

CN 101441345 A 5/2009
CN 201540421 U 8/2010
(Continued)

OTHER PUBLICATIONS

First Office Action, including Search Report, for Chinese Patent Application No. 201410577893.6, dated Jul. 29, 2016, 15 pages.

*Primary Examiner* — Carson Gross
(74) *Attorney, Agent, or Firm* — Westman, Champlin & Koehler, P.A.

(57) ABSTRACT

The present disclosure relates to the field of apparatuses for manufacturing a display. It discloses an apparatus for sticking cloth, including: a rack; a workbench arranged on the rack; a roller frame arranged above the workbench and provided with a pair of clamps which are configured to clamp a rubbing roller onto which a cloth will be stuck; a horizontal moving mechanism mounted on the rack and configured to drive the roller frame to move horizontally; and a heating pad mounted on the workbench and configured to heat a rubbing cloth and a double sided adhesive tape. By means of heating the rubbing cloth and the double sided adhesive tape by the heating pad, the air bubbles on the surface of the rubbing roller may be reduced to optimize the rubbing alignment process. The present disclosure also provides a method for sticking cloth.

11 Claims, 1 Drawing Sheet

(51) Int. Cl.
*B29C 63/00* (2006.01)
*B65H 81/06* (2006.01)
*B29C 63/06* (2006.01)
*G02F 1/13* (2006.01)

(52) U.S. Cl.
CPC ............. *B29C 63/06* (2013.01); *B65H 81/06* (2013.01); *G02F 1/1303* (2013.01); *G02F 1/133784* (2013.01); *Y10T 29/49563* (2015.01)

(58) Field of Classification Search
USPC ................. 156/187, 215, 443, 446–450, 475
See application file for complete search history.

(56) References Cited

FOREIGN PATENT DOCUMENTS

| | | | | | |
|---|---|---|---|---|---|
| CN | 202443222 | U | * | 9/2012 | |
| CN | 103176305 | A | | 6/2013 | |
| DE | EP 0313510 | A2 | * | 4/1989 | .......... B41F 27/1275 |
| JP | 08160428 | A | * | 6/1996 | |
| JP | 11084383 | A | * | 3/1999 | |
| JP | 2001-201747 | A | | 7/2001 | |
| JP | 2014066860 | A | * | 4/2014 | |
| KR | 20130112460 | A | * | 10/2013 | |

\* cited by examiner

APPARATUS AND METHOD FOR STICKING CLOTH

CROSS-REFERENCE TO RELATED APPLICATION

This application claims the benefit of Chinese Patent Application No. 201410577893.6 in the State Intellectual Property Office of China, the whole disclosure of which is incorporated herein by reference.

BACKGROUND OF THE INVENTION

Field of the Invention

The present disclosure relates to the field of apparatuses for manufacturing a display, in particular, relates to an apparatus and a method for sticking cloth.

Description of the Related Art

The conventional apparatus for sticking cloth may stick a rubbing cloth onto a surface of a rubbing roller, however, after the sticking operation, air often exists between the double sided adhesive tape and the rubbing roller and a rubbing cloth to cause air bubbles on the surface of the rubbing roller. These bubbles on the surface of the rubbing roller may degrade the quality of the subsequent process, and may cause the rubbing cloth to fall off to reduce the lifetime of the rubbing roller.

Therefore, it is desired to provide an apparatus for sticking cloth that can reduce the air bubbles on the surface of the rubbing roller.

SUMMARY OF THE INVENTION

In view of the above, an embodiment of the present invention provides an apparatus for sticking cloth, comprising:
 a rack;
 a workbench arranged on the rack;
 a roller frame arranged above the workbench and provided with a pair of clamps which are configured to clamp a rubbing roller onto which a cloth will be stuck;
 a horizontal moving mechanism mounted on the rack and configured to drive the roller frame to move horizontally; and
 a heating pad mounted on the workbench and configured to heat a rubbing cloth and a double sided adhesive tape.

An embodiment of the present invention also provides a method for sticking cloth using the above apparatus, the method further comprising:
 placing a rubbing cloth and a double sided adhesive tape onto a heating pad on a workbench and actuating the heating pad to preheat the rubbing cloth and the double sided adhesive tape;
 clamping a rubbing roller onto which a cloth will be stuck to a roller frame using clamps;
 after the rubbing cloth and the double sided adhesive tape are preheated, actuating a horizontal moving mechanism to drive the roller frame to move horizontally to make the rubbing roller to roll along an upper surface of the double sided adhesive tape such that the rubbing cloth is stuck on an outer surface of the rubbing roller.

REFERENCE NUMERALS

Figure 1:
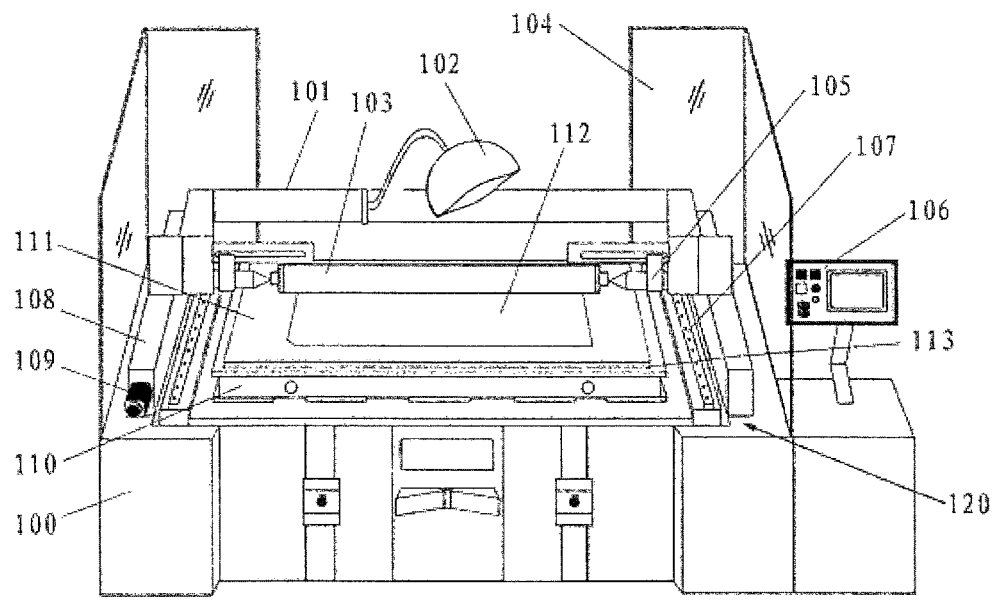
FIG. 1 schematically shows a three dimensional structure of an apparatus for sticking cloth according to an embodiment of the present invention.

100: rack 101: roller frame 102: halogen lamp 103: rubbing roller 104: shielding cover 105: clamp 106: controller 107: straight rail 108: ball screw 109: servo motor 110: workbench 111: soft pad 112: rubbing cloth 113: heating pad 120: horizontal moving mechanism 301: bus for heating pad 302: temperature controller 303: plug

DETAILED DESCRIPTION OF PREFERRED EMBODIMENTS OF THE INVENTION

Exemplary embodiments of the present disclosure will be described in detail with reference to the attached drawings. The embodiments are only given by way of examples, instead of all of embodiments of the present invention.

Figure 2:
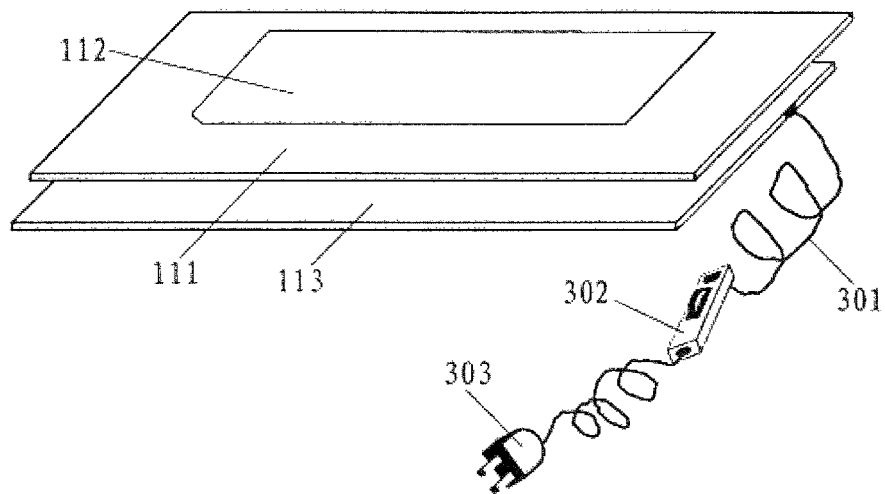
FIG. 2 schematically shows a structure of a heating pad in an apparatus for sticking cloth according to an embodiment of the present invention.

As illustrated in FIGS. 1-2, an apparatus for sticking cloth according to an embodiment of the present invention includes a rack 100, a workbench 110, a horizontal moving mechanism 120, a roller frame 101 and a heating pad 113. The workbench 110 is arranged on the rack 100 and configured to bear a rubbing cloth 112 to be stuck on a rubbing roller 103 and a double sided adhesive tape. The roller frame 101 is arranged above the workbench 110 and provided with a halogen lamp 102 configured to illuminate the workbench 110. The roller frame 101 is provided with a pair of clamps 105 which are configured to clamp a rubbing roller 103 onto which a cloth will be stuck. The heating pad 113 is mounted on the workbench 110. When the cloth is stuck, the rubbing cloth 112 and the double sided adhesive tape are arranged on an upper surface of the heating pad 113. The heating pad 113 is configured to heat the rubbing cloth 112 and the double sided adhesive tape. The horizontal moving mechanism 120 is mounted on the rack 100 and configured to drive the roller frame 110 to move horizontally such that the rubbing roller 103 rolls while its surface is placed against the upper surface of the double sided adhesive tape on the workbench 110. When the cloth is stuck, the heating pad 113 heats the rubbing cloth 112 and the double sided adhesive tape such that the double sided adhesive tape is soften due to thermal expansion. In this way, when the rubbing roller 103 rolls along the upper surface of the double sided adhesive tape to make the cloth roll up, the double sided adhesive tape may be stuck to the rubbing roller 103 and the rubbing cloth 112. When it is cooled, the double sided adhesive tape is contracted thermally. After cooling, small air bubbles between the double sided adhesive tape and the rubbing cloth 112 and the rubbing roller 103 become reduced and even removed, so as to reduce and shrink the air bubbles on the surface of the rubbing roller 103. The rubbing roller 103 onto which the cloth is stuck using the apparatus for sticking cloth has an effect of optimizing rubbing alignment process. The rubbing cloth 112 does not tend to fall off. In this way, the lifetime of the rubbing roller may be prolonged and the work efficiency may be improved.

The heating pad 113 is provided with a temperature controller 302 configured to adjust the temperature of the heating pad 113. The temperature controller 302 has an output end which is connected to the heating pad 113 by a bus 301 for the heating pad and has an input end which is connected to power supply by a plug 303. The temperature controller includes a control chip and a temperature sensor. The temperature sensor is mounted in the heating pad 113 and communicates with the control chip via the bus 301 for the heating pad. The control chip controls to switch on and off the heating pad 113 depending on a temperature signal detected by the temperature sensor. In the embodiment, the clamps 105 may be pneumatic chucks.

In a further embodiment, the heating pad 113 is provided with a soft pad 111 on its upper surface. The soft pad 111 is made from rubber or plastics. When the cloth is stuck, the soft pad may improve sticking the double sided adhesive tape to the rubbing cloth 112 and the rubbing roller 103 to further reduce the residual air between the double sided adhesive tape and the rubbing cloth 112 and the rubbing roller 103.

In a further embodiment, the horizontal moving mechanism 120 includes a servo motor 109, a ball screw 108 and two straight rails 107. The two straight rails 107 are arranged on both sides of the workbench in parallel to each other. The ball screw 108 is arranged in parallel to the straight rails 107. The roller frame 101 is mounted slidably on the straight rails 107 by a slide block and connected to a nut of the ball screw 108. And the servo motor 109 is connected to a screw rod of the ball screw 108 to drive the screw rod to rotate.

In a further embodiment, as illustrated in FIG. 1, the rack 100 is provided with a shielding cover 104 thereon. The shielding cover 104 is mounted on the rack and encloses the workbench 110 to reduce the dust falling onto the workbench 110.

In a further embodiment, the apparatus for sticking cloth further includes a controller 106 connected with the servo motor 109. The controller 106 controls the servo motor to rotate so as to drive the roller frame 101 to move horizontally. Also, the controller 106 is connected with the halogen lamp 102 and the clamps 105.

In a further embodiment, the clamps 105 are mounted on the roller frame 101 by an elevation assembly (not shown). By means of the elevation assembly, a pressure between the rubbing roller 103 and the workbench 110 may be adjusted such that the rubbing cloth 112 can be stuck better on the surface of the rubbing roller 103.

The present disclosure provides a method for sticking cloth using the above apparatus for sticking cloth, the method includes: placing the rubbing cloth 112 onto the heating pad 113 on the workbench 110 and placing the double sided adhesive tape on the upper surface of the rubbing cloth 112; actuating the heating pad 113 to preheat the rubbing cloth 112 and the double sided adhesive tape; clamping a rubbing roller 103 onto which a cloth will be stuck to the roller frame 101 using the clamps 105; after the rubbing cloth 112 and the double sided adhesive tape are preheated, actuating a horizontal moving mechanism 120 to drive the roller frame 101 to move horizontally to make the rubbing roller 103 to roll along an upper surface of the double sided adhesive tape such that the rubbing cloth 112 is stuck on a circumferential outer surface of the rubbing roller 103 by the double sided adhesive tape.

It should be noted that the rubbing cloth and the double sided adhesive tape may be separated from each other when the cloth is stuck, or one side of the double sided adhesive tape is stuck to the rubbing cloth.

By means of sticking the rubbing cloth onto the rubbing roller using the apparatus for sticking cloth according to the present disclosure, the rubbing cloth and the double sided adhesive tape are heated by the heating pad to soften the double sided adhesive tape such that it can be stuck onto the rubbing roller better. In cooling process after the cloth rolls up, small air bubbles between the double sided adhesive tape and the rubbing cloth and the rubbing roller become reduced and even eliminated so as to reduce and contract the air bubbles on the surface of the rubbing roller and optimize the effects of the rubbing alignment process. In this way, the rubbing cloth does not tend to fall off and the lifetime of the rubbing roller may be prolonged and the work efficiency may be improved.

Although several exemplary embodiments have been shown and described, the present invention is not limited to those and it would be appreciated by those skilled in the art that various changes, equivalents or modifications may be made in these embodiments without departing from the principles and spirit of the disclosure, the scope of which is defined in the claims and their equivalents.

What is claimed is:

1. An apparatus for sticking cloth, comprising:
   a rack;
   a workbench arranged on the rack;
   a roller frame arranged above the workbench and provided with a pair of clamps which are configured to clamp a rubbing roller onto which a cloth will be stuck;
   a horizontal moving mechanism mounted on the rack and configured to drive the roller frame to move horizontally; and
   a heating pad mounted on the workbench and configured to heat a rubbing cloth and a double sided adhesive tape.

2. The apparatus according to claim 1, wherein the heating pad is provided with a soft pad on its upper surface.

3. The apparatus according to claim 2, wherein the soft pad is made from rubber or plastics.

4. The apparatus according to claim 1, wherein the heating pad is provided with a temperature controller.

5. The apparatus according to claim 1, wherein the horizontal moving mechanism comprises a servo motor, a ball screw and two straight rails, the two straight rails being arranged on both sides of the workbench in parallel to each other, the ball screw being arranged in parallel to the straight rails, and wherein the roller frame is mounted slidably on the straight rails by a slide block and connected to a nut of the ball screw, and the servo motor is connected to a screw rod of the ball screw.

6. The apparatus according to claim 5, further comprising a controller connected with the servo motor.

7. The apparatus according to claim 1, wherein the clamps are pneumatic chucks.

8. The apparatus according to claim 1, wherein the roller frame is provided with a halogen lamp.

9. The apparatus according to claim 1, wherein the rack is provided with a shielding cover thereon.

10. The apparatus according to claim 1, wherein the clamps are mounted on the roller frame by an elevation assembly.

11. A method for sticking a cloth using the apparatus according to claim 1, the method comprising:
   placing a rubbing cloth and a double sided adhesive tape onto the heating pad on the workbench and actuating the heating pad to preheat the rubbing cloth and the double sided adhesive tape;
   clamping the rubbing roller onto which the cloth will be stuck to the roller frame using the clamps; and
   after the rubbing cloth and the double sided adhesive tape are preheated, actuating the horizontal moving mechanism to drive the roller frame to move horizontally to make the rubbing roller roll along an upper surface of the double sided adhesive tape such that the rubbing cloth is stuck on an outer surface of the rubbing roller.

* * * * *